(12) United States Patent
Sakaguchi

(10) Patent No.: US 10,829,310 B2
(45) Date of Patent: Nov. 10, 2020

(54) WEAR DETECTION DEVICE FOR CONVEYOR BELT

(71) Applicant: BRIDGESTONE CORPORATION, Tokyo (JP)

(72) Inventor: Toshiki Sakaguchi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 274 days.

(21) Appl. No.: 15/998,656

(22) PCT Filed: Feb. 28, 2017

(86) PCT No.: PCT/JP2017/007710
§ 371 (c)(1),
(2) Date: Aug. 16, 2018

(87) PCT Pub. No.: WO2017/150508
PCT Pub. Date: Sep. 8, 2017

(65) Prior Publication Data
US 2020/0262657 A1 Aug. 20, 2020

(30) Foreign Application Priority Data
Feb. 29, 2016 (JP) .................................. 2016-038342

(51) Int. Cl.
*B65G 43/02* (2006.01)
*G01N 27/82* (2006.01)
(Continued)

(52) U.S. Cl.
CPC ............. *B65G 43/02* (2013.01); *G01N 27/82* (2013.01); *G06Q 10/20* (2013.01); *G08B 21/182* (2013.01);
(Continued)

(58) Field of Classification Search
CPC ........ B65G 43/02; G01N 27/82; G06Q 10/20; G08B 21/182
(Continued)

(56) References Cited

U.S. PATENT DOCUMENTS 6,581,755 B1 * 6/2003 Wilke .................... B65G 43/02
198/810.02
6,712,199 B1 3/2004 Bruckner et al.
(Continued)

FOREIGN PATENT DOCUMENTS

EP 1 873 088 A1 1/2008
JP 2005-138979 A 6/2005
(Continued)

OTHER PUBLICATIONS

International Search Report for PCT/JP2017/007710 dated May 30, 2017.
(Continued)

*Primary Examiner* — Douglas A Hess
(74) *Attorney, Agent, or Firm* — Sughrue Mion, PLLC

(57) ABSTRACT

A wear detection device for a conveyor belt (1) includes magnet members (12a and 12b) buried in a conveyor belt (11) having an endless belt shape, a magnetic sensor (13j) which is arranged opposite to an outer circumferential surface of the conveyor belt (11) and is configured to detect magnetic fields from the magnet members (12a and 12b) to generate an output signal, and a calculation unit (141) which is configured to calculate the thickness of the conveyor belt (11) according to the output signal generated by the magnetic sensor (13j). The wear detection device for a conveyor belt (1) further includes a storage unit (142) which is configured to store the thickness calculated by the calculation unit (141), and a processing unit (143) which is configured to calculate the decrease amount of the thickness per
(Continued)

a predetermined moving load amount of the conveyor belt (11) according to the thickness stored in the storage unit (142) and determine whether or not this value exceeds a threshold value set in advance.

15 Claims, 3 Drawing Sheets

(51) Int. Cl.
    *G06Q 10/00*     (2012.01)
    *G08B 21/18*     (2006.01)

(52) U.S. Cl.
    CPC ............... *B65G 2203/0275* (2013.01); *B65G 2203/043* (2013.01); *B65G 2207/48* (2013.01)

(58) Field of Classification Search
    USPC ............ 198/502.1, 502.2, 810.02, 844.1; 324/209
    See application file for complete search history.

(56) References Cited

U.S. PATENT DOCUMENTS

| | | | | |
|---|---|---|---|---|
| 7,275,637 B2 * | 10/2007 | Brown | ................... | B65G 43/02 198/502.1 |
| 7,347,317 B2 * | 3/2008 | Aizawa | ................ | B65G 43/02 198/690.1 |
| 7,748,521 B2 * | 7/2010 | Aizawa | ................ | B65G 43/02 198/810.03 |
| 7,766,157 B2 * | 8/2010 | Nishikita | ............... | B65G 43/02 198/810.02 |
| 8,330,452 B2 * | 12/2012 | Furukawa | ............... | B65G 43/02 324/207.11 |
| 8,910,777 B2 * | 12/2014 | Minkin | .................. | B65G 43/02 198/810.02 |
| 9,811,809 B2 * | 11/2017 | Sakuragi | ................ | B65G 43/02 |
| 9,988,217 B2 * | 6/2018 | Hou | ....................... | B65G 43/02 |
| 10,196,216 B2 * | 2/2019 | Sakuragi | ................ | B65G 15/08 |
| 10,538,393 B2 * | 1/2020 | Wagner | .................. | B65G 23/44 |
| 10,656,055 B2 * | 5/2020 | Hou | ....................... | B65G 15/30 |
| 2006/0219528 A1 | 10/2006 | Aizawa et al. | | |
| 2009/0266684 A1 | 10/2009 | Nishikita | | |
| 2011/0050213 A1 | 3/2011 | Furukawa | | |
| 2012/0306481 A1 | 12/2012 | Nakamura et al. | | |
| 2015/0170109 A1 | 6/2015 | Sakuragi | | |

FOREIGN PATENT DOCUMENTS

| | | |
|---|---|---|
| JP | 2009-166947 A | 7/2009 |
| JP | 2014-58394 A | 4/2014 |
| WO | 2011/058755 A1 | 5/2011 |
| WO | 2013/179903 A | 12/2013 |

OTHER PUBLICATIONS

Communication dated Feb. 5, 2019 from the European Patent Office in counterpart EP application No. 17759974.3.

* cited by examiner

WEAR DETECTION DEVICE FOR CONVEYOR BELT

CROSS REFERENCE TO RELATED APPLICATIONS

This application is a National Stage of International Application No. PCT/JP2017/007710 filed Feb. 28, 2017, claiming priority based on Japanese Patent Application No. 2016-038342 filed Feb. 29, 2016, the contents of which is incorporated herein by reference.

TECHNICAL FIELD

The present invention relates to a wear detection device for a conveyor belt.

BACKGROUND ART

In the related art, a belt conveyor is used in carrying a mineral such as coal and ore mined in a mining site and transporting industrial products in a factory. In addition, a method of detecting an abnormality of a conveyor belt used in the belt conveyor is disclosed in the related art.

For example, a monitoring system for finding out the cutting of core canvas of the conveyor belt and preventing the conveyor belt from being cut is disclosed in Patent Document 1.

CITATION LIST

Patent Document

[Patent Document 1] Japanese Unexamined Patent Application, First Publication No. 2014-58394

SUMMARY OF INVENTION

Technical Problem

The conveyor belt wears due to contact with an object to be transported or the like. The conveyor belt wears away as the moving distance of the conveyor belt increases. As the conveyor belt wears away, the thickness of the conveyor belt decreases. After the conveyor belt has worn away to some extent, the conveyor belt wears at a rapid speed in some cases. This phenomenon will be described with reference to FIG. 5.

FIG. 5 shows the moving distance of the conveyor belt and how the conveyor belt wears away. In FIG. 5, the horizontal axis represents the moving distance of the conveyor belt and the vertical axis represents the thickness of the conveyor belt. The slope of the graph represents a wear amount (hereinafter, this will be referred to as a wearing speed) of the conveyor belt per a unit moving distance. In a case where the conveyor belt moves at a constant speed, the horizontal axis of FIG. 5 can be replaced with time.

A control limit thickness shown in FIG. 5 represents a thickness at which the conveyor belt is required to be replaced. That is, in a case where the conveyor belt wears away and the thickness of the conveyor belt decreases to the control limit thickness, it is necessary to replace the conveyor belt.

In FIG. 5, compared to the slope from a time point (hereinafter, simply referred to as X1) of the moving distance X1 to X2, the slope from X2 to X3 is steep. This means that the wearing speed has rapidly increased once the moving distance reaches X2. As described above, in a case where the wearing speed of the conveyor belt has rapidly increased, there is a possibility that the thickness of the conveyor belt abruptly falls short of the control limit thickness and the belt conveyor abruptly stops.

In view of such circumstances, an object of the invention is to provide a wear detection device for a conveyor belt that can sense an increase in the wearing speed in a case where the wearing speed of the conveyor belt has rapidly increased.

Solution to Problem

According to a first aspect of the invention, there is provided a wear detection device for a conveyor belt including a magnet member that is buried in a conveyor belt having an endless belt shape, a magnetic sensor that is arranged opposite to an outer circumferential surface of the conveyor belt and is configured to detect a magnetic field from the magnet member to generate an output signal, a calculation unit that is configured to calculate a thickness of the conveyor belt according to the output signal generated by the magnetic sensor, a storage unit that is configured to store the thickness calculated by the calculation unit, and a processing unit that is configured to calculate the decrease amount of the thickness per a predetermined moving load amount of the conveyor belt according to the thickness stored in the storage unit and determine whether or not the value exceeds a threshold value set in advance.

Advantageous Effects of Invention

According to the invention, it is possible to provide a wear detection device for a conveyor belt that can sense an increase in a wearing speed in a case where the wearing speed of the conveyor belt has rapidly increased.

DESCRIPTION OF EMBODIMENTS

Embodiment 1

Figure 1:
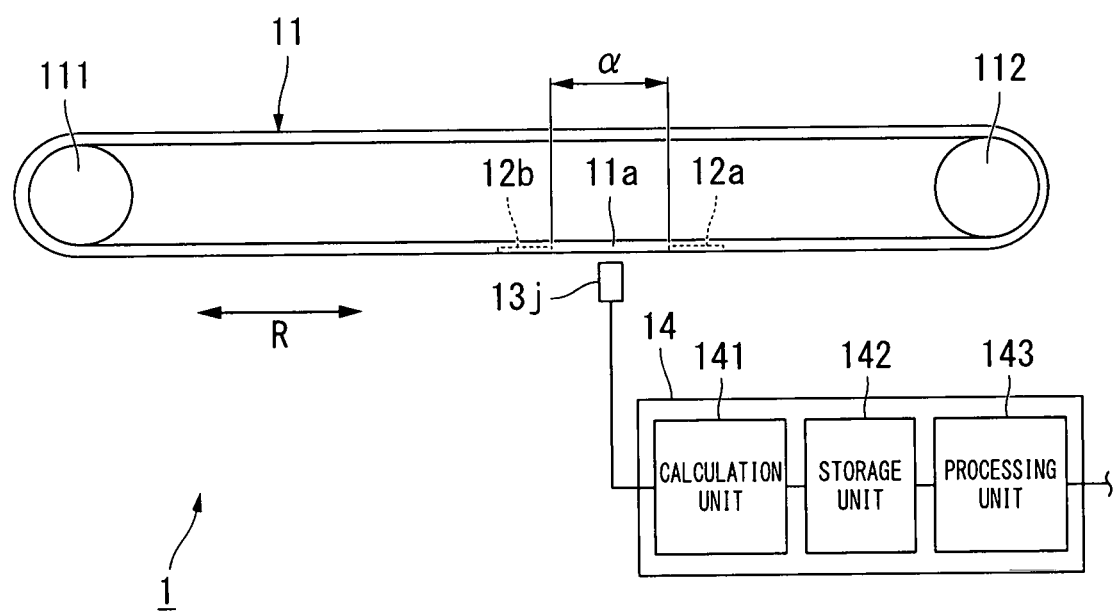
FIG. 1 is a view showing a configuration example of a wear detection device for a conveyor belt of the invention.
Figure 2:
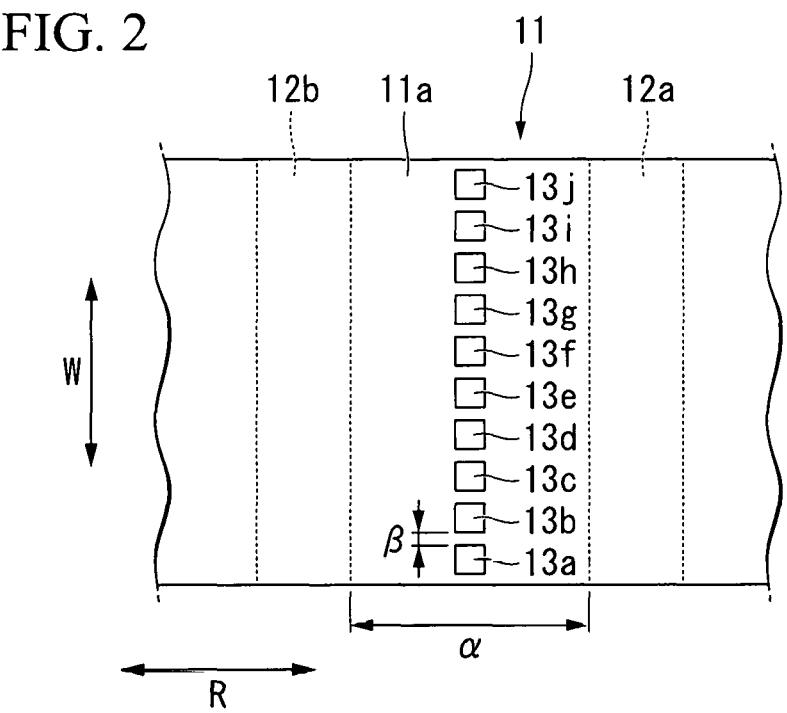
FIG. 2 is a bottom view showing the periphery of magnetic sensors of FIG. 1.

Hereinafter, a configuration of a wear detection device for a conveyor belt 1 according to Embodiment 1 will be described with reference to FIGS. 1 and 2. FIG. 1 is a side view of the wear detection device for a conveyor belt 1 according to the embodiment. FIG. 2 is a bottom view focused on the periphery of magnetic sensors 13a to 13j of the wear detection device for a conveyor belt 1 shown in FIG. 1.

First, a conveyor belt 11 will be described. As shown in FIGS. 1 and 2, the conveyor belt 11 is used for conveying an object to be transported (not illustrated), and is formed in an endless belt shape. The width or the perimeter of the conveyor belt 11 is determined by the type or the distance to be conveyed of the object to be transported. For example, in a case of conveying a mineral mined in a mining site, the conveyor belt 11 having a width of approximately 600 mm to 3,000 mm and a perimeter of approximately 100 m to 10,000 m is used.

The conveyor belt 11 is supported by a drive pulley 111 and a driven pulley 112 under a predetermined tension, and moves by a driving force transmitted from the drive pulley 111. Rotating shafts of the drive pulley 111 and the driven pulley 112 are parallel to each other and extend in a width direction W of the conveyor belt 11. The conveyor belt 11 includes a cover rubber 11a having an endless belt shape on which an object to be transported is placed. For example, natural rubber (NR), isoprene rubber (IR), butadiene rubber (BR), and styrene-butadiene rubber (SBR) may be used alone or in mixture as the cover rubber 11a.

The wear detection device for a conveyor belt 1 has rubber magnets 12a and 12b, which are magnet members buried in the conveyor belt 11, the magnetic sensors 13a to 13j, which are arranged opposite to an outer circumferential surface of the conveyor belt 11 and detect magnetic fields from the rubber magnets 12a and 12b to generate output signals, and a calculation unit 141 which detects the thickness of the conveyor belt 11 based on output signals generated by the magnetic sensors 13a to 13j.

The rubber magnets 12a and 12b extend in the width direction W of the conveyor belt 11. In an example illustrated in FIG. 2, the rubber magnets 12a and 12b are arranged over the full width of the conveyor belt 11 in the width direction W. The rubber magnets 12a and 12b are formed to have a rectangular shape of which short sides extend in a circumferential direction R and long sides extend in the width direction W. In addition, the rubber magnets 12a and 12b are buried in the conveyor belt 11 at a predetermined interval a in the circumferential direction R. It is sufficient that the interval a is determined as any interval according to the perimeter of the conveyor belt 11 or the type of an object to be transported. For example, in a case where a mined mineral is carried by the conveyor belt 11 having a perimeter of 3,000 m, rubber magnets may be buried in ten portions such that α=300 m is satisfied.

The rubber magnets 12a and 12b have flexibility to an extent that the rubber magnets 12a and 12b can be deformed, following the conveyor belt 11. The rubber magnets 12a and 12b are formed to be magnetized in a thickness direction of the conveyor belt 11, for example, by a bond magnetic body or the like formed by distributing magnetic powder made of a permanent magnet material in a rubber compound. For example, a magnet powder made of rare-earth, such as neodymium iron boron and samarium iron nitrogen, an alnico magnet, ferrite and the like can be adopted as the magnetic powder.

The rubber magnets 12a and 12b are exposed to a placing surface of the conveyor belt 11. For this reason, when the conveyor belt 11 wears, the rubber magnets 12a and 12b wear. When the rubber magnets 12a and 12b wear, magnetic fields generated by the rubber magnets 12a and 12b change in correlation with wear amounts. Therefore, the thicknesses of the rubber magnets 12a and 12b can be detected by the magnetic sensors 13a to 13j detecting magnetic fields generated by the rubber magnets 12a and 12b. The wear of the rubber magnets 12a and 12b occurs in accordance with the wear of the conveyor belt 11. That is, data for calculating the thicknesses of portions of the conveyor belt 11 in which the rubber magnets 12a and 12b are buried can be collected by the magnetic sensors 13a to 13j detecting magnetic fields generated by the rubber magnets 12a and 12b.

The plurality of magnetic sensors 13a to 13j are arranged below the conveyor belt 11 at intervals β in the width direction W of the conveyor belt 11. It is sufficient that the intervals β are determined as any intervals according to the width of the conveyor belt 11, the number of respective magnetic sensors to be arranged, and the type of an object to be transported. Each of the magnetic sensors 13a to 13j is opposite to the outer circumferential surface of the conveyor belt 11.

For example, gauss meters or loop coils can be adopted as the magnetic sensors 13a to 13j. When the magnetic sensors 13a to 13j detect a magnetic field, the magnetic sensors generate an output signal according to the detection. Each of the magnetic sensors 13a to 13j is electrically connected to a control panel 14, and transmits the output signal generated according to the detected magnetic field to the control panel 14.

The control panel 14 includes the calculation unit 141, a storage unit 142, and a processing unit 143. Each of the magnetic sensors 13a to 13j is electrically connected to the calculation unit 141. The calculation unit 141 is electrically connected to the storage unit 142. The storage unit 142 is electrically connected to the processing unit 143.

Next, effects of the wear detection device for a conveyor belt 1 configured as described above will be described.

Figure 3:
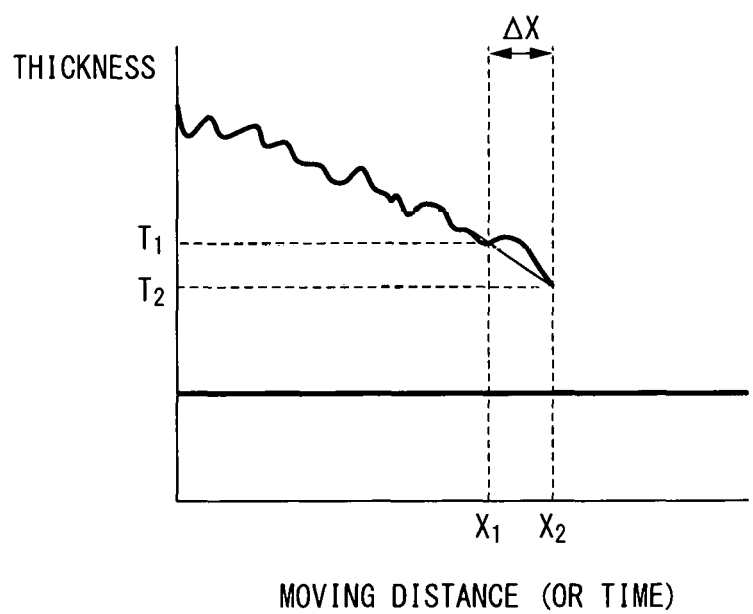
FIG. 3 is a view showing a calculation method of a decrease amount in a thickness of a conveyor belt of Embodiment 1.

When the conveyor belt 11 moves by a driving force from the drive pulley 111, the rubber magnets 12a and 12b buried in the conveyor belt 11 pass through the vicinity of the magnetic sensors 13a to 13j in turn. The magnetic sensors 13a to 13j detect a magnetic field generated by each of the passing rubber magnets 12a and 12b. The magnetic sensors 13a to 13j generate each of output signals according to magnetic fields generated by the rubber magnets 12a and 12b to transmit to the calculation unit 141 of the control panel 14. Based on the output signals from the magnetic sensors 13a to 13j, the calculation unit 141 calculates the thickness of each of portions in the circumferential direction R of the conveyor belt 11, in which the rubber magnets 12a and 12b are buried, and the width direction W in which the magnetic sensors 13a to 13j are arranged. The thickness of each of the portions of the conveyor belt 11, which is calculated by the calculation unit 141, is stored in the storage unit 142. Insofar as a moving speed of the conveyor belt 11 is constant, the rubber magnets 12a and 12b regularly pass through the vicinity of the magnetic sensors 13a to 13j. Therefore, the thickness of each of the portions of the conveyor belt 11 in which the rubber magnets 12a and 12b are buried is regularly stored in the storage unit 142. FIG. 3 shows changes in the thickness of any one portion, out of the thicknesses of respective portions of the conveyor belt 11 stored in the storage unit 142 in such a manner.

In a graph shown in FIG. 3, the vertical axis represents the calculated thickness of any portion of the conveyor belt 11. In addition, the horizontal axis represents the moving distance of the conveyor belt 11. In a case where the moving speed of the conveyor belt 11 is constant, the horizontal axis of FIG. 3 can be replaced with time.

The calculation unit 141 calculates the thickness of any portion of the conveyor belt 11 shown in the graph of FIG. 3 by the magnetic sensors 13a to 13j detecting magnetic fields generated by the rubber magnets 12a and 12b and by the magnetic sensors 13a to 13j outputting data collected at that time to the calculation unit 141. For this reason, the thickness of any portion of the conveyor belt 11 varies to some extent. Due to this variation, the graph shown in FIG. 3 has "undulation" instead of being linear.

The processing unit 143 calculates a decrease amount γ of the thickness of the conveyor belt 11 (hereinafter, simply referred to as γ) per a predetermined moving distance ΔX (predetermined moving load amount) based on data of the thickness of the conveyor belt 11, which is stored in the storage unit 142. The moving load amount corresponds to a moving distance, a moving time, the conveyed amount of an object to be transported, the number of laps of the conveyor belt, or the rotation speed of a drive motor of the conveyor belt. At this time, when the value of ΔX is excessively small, γ cannot be accurately calculated in some cases due to the "undulation" described above. Therefore, it is desirable that the value of ΔX be a high value to some extent that the effect of "undulation" is small. For example, the value of ΔX may be a distance by which the conveyor belt has moved for a day.

The processing unit 143 according to the embodiment reads, for example, a thickness T1 of the conveyor belt 11 at a time point when the moving distance is X1 in FIG. 3 and a thickness T2 of the conveyor belt 11 at a time point when the moving distance is X2 from the storage unit 142. Then, the processing unit 143 calculates the value of γ through Equation (1).

$$\gamma = (T1 - T2)/\Delta X \tag{1}$$

The processing unit 143 determines whether or not the value of γ exceeds a threshold value set in advance. After the value of γ during normal moving is learned in advance, the threshold value may be set to a value slightly exceeding the value of γ. When the threshold value is set in this manner, it can be detected at an early stage that the value of γ has increased. In addition, a user may set the threshold value to any value in accordance with a status of use of a belt conveyor. That is, the threshold value may be changed appropriately. In this manner, the conveyor belt 11 can be appropriately operated in accordance with the user's convenience.

The processing unit 143 calculates and determines the value of γ for each of a moving distance which is equal to or shorter than ΔX. Accordingly, it is possible to prevent a moving section, in which the value of γ cannot be calculated, from being generated.

In a case where it is determined that the value of γ is higher than the threshold value, the processing unit 143, for example, turns on an LED lamp of the control panel 14 to notify that the value of γ exceeds the threshold value. Alternatively, in a case where the value of γ exceeds the threshold value, the processing unit 143 may transmit the information through a warning mail or the like to an external computer (external server) that manages the control panel 14.

In this manner, a wear state of the conveyor belt 11, which is in a remote area, can be immediately learned.

In the embodiment, the processing unit 143 calculates the value of γ (decrease amount of the thickness of the conveyor belt 11 per a predetermined moving load amount) based on output signals from the plurality of magnetic sensors 13a to 13j. In a case where one of the values exceeds the threshold value set in advance, the processing unit compares this value with the value of γ calculated based on output signals from other magnetic sensors 13a to 13j adjacent to the magnetic sensors 13a to 13j that generated the output signal on which the calculation of this value is based.

For example, in a case where γ calculated based on an output signal from the magnetic sensor 13f (hereinafter, referred to as $\gamma_f$) exceeds the threshold value, the processing unit 143 compares the value of $\gamma_f$ with the value of γ calculated based on an output signal from the magnetic sensor 13e adjacent to the magnetic sensor 13f (hereinafter, referred to as $\gamma_e$) and the value of γ calculated based on an output signal from the magnetic sensor 13g (hereinafter, referred to as $\gamma_g$).

In addition, the processing unit 143 calculates the value of γ based on output signals from the plurality of magnetic sensors 13a to 13j. Out of the values, the processing unit 143 compares a certain value calculated based on an output signal from a certain magnetic sensor with an average value of the plurality of remaining values.

For example, the processing unit 143 compares the value of γ calculated based on an output signal from the magnetic sensor 13a (hereinafter, referred to as $\gamma_a$) with an average value of the values γ calculated based on output signals from the remaining magnetic sensors 13b to 13j (hereinafter, referred to as $\gamma_b$ to $\gamma_j$).

In addition, the processing unit 143 calculates the value of γ based on output signals from the plurality of magnetic sensors 13a to 13j for each of the plurality of rubber magnet 12a and 12b.

As described above, in the wear detection device for a conveyor belt 1 according to the embodiment, the storage unit 142 stores the thickness of the conveyor belt 11 calculated by the calculation unit 141, and the processing unit 143 calculates the value of γ based on the thickness stored in the storage unit 142 and determines whether or not the value of γ exceeds the threshold value set in advance. Therefore, in a case where the wearing speed of the conveyor belt 11 has rapidly increased, this increase can be sensed.

That is, in the wear detection device for a conveyor belt 1 according to the embodiment, the processing unit 143 calculates the decrease amount γ of the thickness per a predetermined moving load amount of the conveyor, belt 11 and determines whether or not this value exceeds the threshold value set in advance. Therefore, in a case where the wearing speed of the conveyor belt 11 has rapidly increased, this increase can be sensed.

In addition, for example, when the value of $\gamma_f$ exceeds the threshold value as described above, the processing unit 143 compares the value of $\gamma_f$ with the value of $\gamma_e$ or the value of $\gamma_g$. Therefore, it can be determined that whether a rapid increase in the wearing speed has occurred only in a portion of the conveyor belt 11 opposite to the magnetic sensor 13f, or an increase in the wearing speed has also occurred in portions opposite to the other magnetic sensors 13e and 13g adjacent to the magnetic sensor 13f.

That is, the plurality of magnetic sensors 13a to 13j are arranged at intervals in the width direction of the conveyor belt 11. The processing unit 143 calculates the decrease amount γ of the thickness of the conveyor belt 11 per a predetermined moving load amount based on output signals from the plurality of magnetic sensors 13a to 13j. In a case where one of the calculated values exceeds the threshold value set in advance, this value may be compared with the decrease amount of the thickness per a predetermined moving load amount calculated based on each of output signals from other magnetic sensors adjacent to a magnetic sensor that generated the output signal on which the calculation of this value is based.

In this manner, in a case where the wearing speed of the conveyor belt 11 has rapidly increased in one portion in the width direction of the conveyor belt 11, the processing unit 143 can compare the wearing speed with the wearing speeds of other portions adjacent to this portion. For this reason, it is easy to find out whether a rapid increase in the wearing speed has occurred only in a certain portion, or the rapid increase has occurred in the entire width direction of the conveyor belt 11.

A case where the conveyor belt 11 moves while staying in contact with a structure such as a frame is regarded as a cause of a rapid increase in the wearing speed of the conveyor belt 11. In such a case, if there is not much change in the value of $\gamma_e$ or the value of $\gamma_g$ in spite of the fact that the value of $\gamma_f$ has rapidly increased, this contributes, in some cases, to identifying a cause of abnormal wear, such as a portion of the conveyor belt 11 opposite to the magnetic sensor 13f is in contact with a structure such as a frame.

That is, only one portion of the conveyor belt 11 in the width direction of the conveyor belt 11 abnormally wears in some cases. For example, in a case where the conveyor belt 11 continues to move while staying in contact with a structure such as a frame, only a part in contact with the structure abnormally wears. In such a case, since a rapid increase in the wearing speed occurs only in a certain portion, finding-out as described above contributes to identifying a cause of abnormal wear in some cases.

As described above, since the processing unit 143 compares, for example, the value of $\gamma_a$ with an average value of the values of $\gamma_b$ to $\gamma_j$, it is possible to determine whether there is a bias in the wearing speed in the width direction W of the conveyor belt 11 in a case where there is a difference between the value of $\gamma_a$ and the average value of the values of $\gamma_b$ to $\gamma_j$.

That is, the plurality of magnetic sensors 13a to 13j are arranged at intervals in the width direction of the conveyor belt 11. The processing unit 143 calculates the decrease amount $\gamma$ of the thickness of the conveyor belt 11 per a predetermined moving load amount based on output signals from the plurality of magnetic sensors 13a to 13j. Out of the calculated values, a certain value calculated based on an output signal from a certain magnetic sensor may be compared with an average value of the plurality of remaining values.

In this manner, since the processing unit 143 can compare the wearing speed of the conveyor belt 11 in the entire width direction with the wearing speed of a certain portion, the processing unit 143 can find out whether or not there is a bias in the wearing speed in the width direction of the conveyor belt 11.

Figure 5:
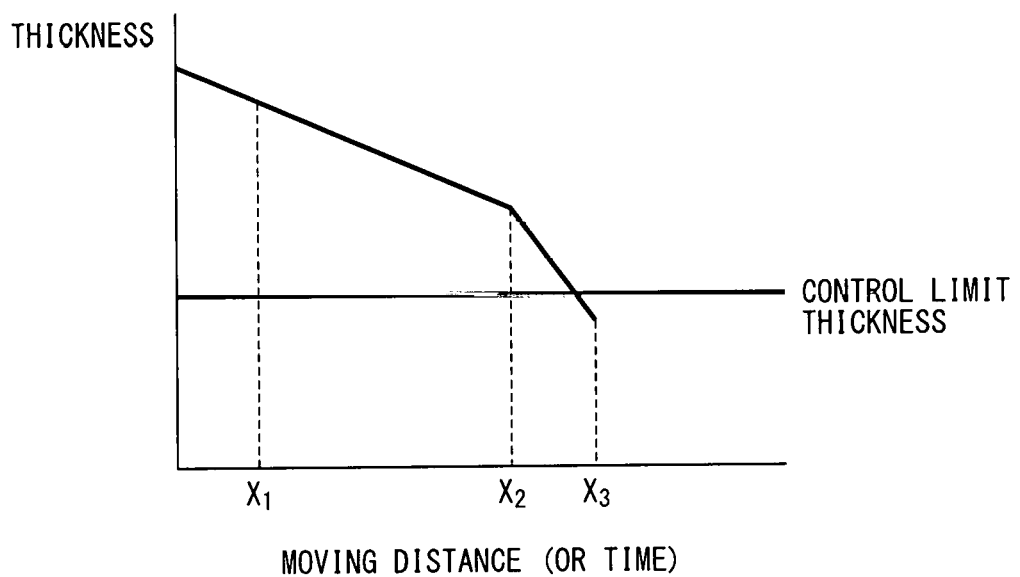
FIG. 5 is a view showing a problem to be solved in the invention.

For example, an object to be transported placed on the conveyor belt 11 being at a biased position is regarded as a cause of the occurrence of a bias in the wearing speed in the width direction W of the conveyor belt 11. That is, the object to be transported is biased and placed on the conveyor belt 11 in the width direction of the conveyor belt 11 in some cases. For example, in a case where an object to be transported is placed only on one portion in the width direction, the one portion of the conveyor belt wears at a rapid speed compared to other portions. Then, the thickness of the one portion reaches a control limit thickness shown in FIG. 5. Therefore, it is necessary to replace the conveyor belt 11.

In the example described above, it can be estimated that an object to be transported is biased and placed in a portion of the conveyor belt 11 opposite to the magnetic sensor 13a.

Therefore, when it is determined whether or not there is a bias in the wearing speed in the width direction of the conveyor belt 11 as described above, it is possible to detect a bias in the position of the object to be transported in the width direction W of the conveyor belt 11 in some cases. Similarly, also when a bias in the wearing speed in the width direction W of the conveyor belt 11 occurs due to the meandering of the conveyor belt 11, this bias can be detected in some cases.

In addition, the plurality of rubber magnets 12a and 12b (magnet members) are buried in the conveyor belt 11 at intervals in the circumferential direction R, and the processing unit 143 calculates the value of $\gamma$ (decrease amount of the thickness of the conveyor belt 11 per a predetermined moving load amount) for each of the plurality of rubber magnets 12a and 12b. For this reason, wearing speeds can be detected at a plurality of portions of the conveyor belt 11 in the circumferential direction R.

In this manner, the processing unit 143 can detect wearing speeds at a plurality of portions of the conveyor belt 11 in the circumferential direction.

The wear of the conveyor belt 11 continues in the circumferential direction in some cases. In such a case, it is possible to find out the wear of which portion in the circumferential direction is excessive by determining wearing speeds at a plurality of portions in the circumferential direction.

Embodiment 2

Next, another embodiment according to the invention will be described but basic configurations are the same as those of Embodiment 1. For this reason, the same configurations will be assigned with the same reference signs, and a description thereof will be omitted. Only different points will be described.

In the embodiment, only a calculation method of the value of $\gamma$ (decrease amount of the thickness of the conveyor belt 11 per a predetermined moving load amount) is different.

Figure 4:
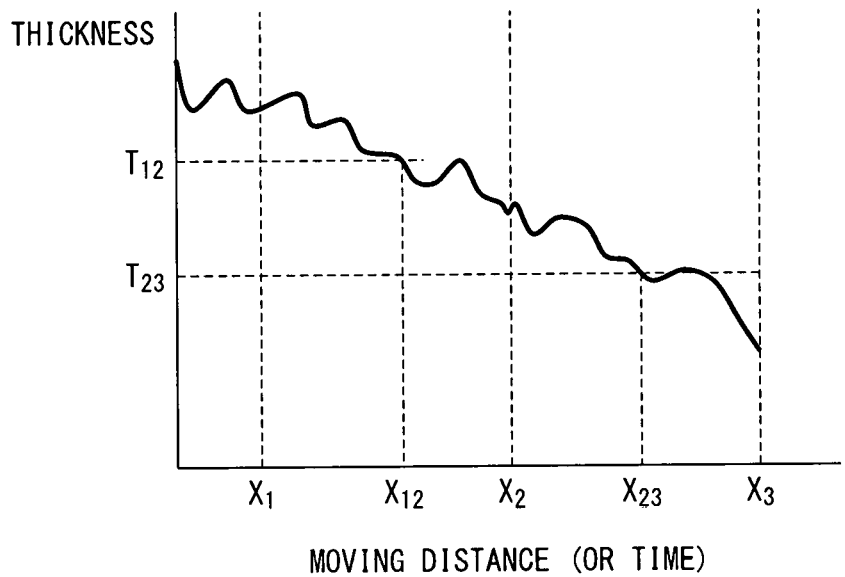
FIG. 4 is a view showing a calculation method of a decrease amount in a thickness of a conveyor belt of Embodiment 2.

FIG. 4 is a graph showing a method for the processing unit 143 of the embodiment to calculate the value of $\gamma$ based on data of thickness of the conveyor belt 11 stored in the storage unit 142. As in Embodiment 1, "undulation" has occurred also in the graph shown in FIG. 4.

In FIG. 4, the processing unit 143 calculates an average value (hereinafter, referred to as T12) of the thicknesses of the conveyor belt 11 in a section of the moving distances X1 to X2. Similarly, the processing unit calculates an average value (hereinafter, referred to as T23) of the thicknesses of the conveyor belt 11 in a section of the moving distances X2 to X3.

Then, the value of $\gamma$ is acquired through Equation (2). Herein, X12 is a midpoint of the section of the moving distances X1 to X2, and X23 is a midpoint of the section of the moving distances X2 to X3.

$$\gamma=(T23-T12)/(X23-X12) \tag{2}$$

The processing unit 143 calculates the value of $\gamma$ for each of moving distances, which is equal to or smaller than a difference between the longest moving distance X3 and the shortest moving distance X1 in two sections of moving distances. Accordingly, as in Embodiment 1, it is possible to prevent a moving section, in which the value of $\gamma$ cannot be calculated, from being generated.

In addition, since the processing unit 143 of the embodiment calculates the value of $\gamma$ based on an average value of the thicknesses of the conveyor belt 11 in each of two sections as described above, an error in calculating $\gamma$ caused by "undulation" can be reduced.

A technical scope of the invention is not limited to the embodiments described above, and it is possible to add various modifications without departing from the scope of the invention.

For example, the processing unit 143 calculates the decrease amount of the thickness of the conveyor belt 11 per a predetermined moving distance of the conveyor belt 11 in the embodiments described above. Without being limited thereto, however, the processing unit 143 may calculate the decrease amount of the thickness per a predetermined moving time, the decrease amount of the thickness per a predetermined conveyed amount of an object to be transported, the decrease amount of the thickness per a predetermined number of laps of the conveyor belt 11, or the decrease amount of the thickness per a predetermined rotation speed of the drive motor of the conveyor belt 11.

For example, in a case of calculating the decrease amount of the thickness of the conveyor belt 11 for each predetermined moving time, the horizontal axis X of FIG. 3 may be considered as a moving time. Also in this case, the decrease amount $\gamma$ of the thickness of the conveyor belt 11 per a predetermined moving time $\Delta X1$ (predetermined moving load amount) can be calculated by using Equation (1). As described above, the processing unit 143 may determine whether or not the decrease amount $\gamma$ exceeds the threshold value by repeatedly calculating the decrease amount $\gamma$ of the thickness of the conveyor belt 11 for the predetermined moving time $\Delta X1$, the next predetermined moving time $\Delta X2$, or the next predetermined moving time $\Delta X3$.

In addition, the number of magnetic sensors to be arranged may be reduced to one. Alternatively, a configuration where a plurality of magnetic sensor are arranged and then the value of $\gamma$ is calculated based on data obtained through detection by any one of the magnetic sensors according to a status of use may be adopted.

Although the magnetic sensors 13a to 13j are arranged at the same position in the circumferential direction R in the embodiments described above, the plurality of magnetic sensors 13a to 13j may be arranged at intervals in the circumferential direction R of the conveyor belt.

Only one rubber magnet may be buried in the conveyor belt 11.

In addition, a configuration where the processing unit 143 calculates the value of $\gamma$ based on output signals from the plurality of magnetic sensors 13a to 13j, and in a case where one of the values exceeds the threshold value set in advance, the processing unit 143 compares this value with the value of $\gamma$ calculated based on output signals from other magnetic sensors 13a to 13j adjacent to the magnetic sensors 13a to 13j that generated the output signal on which the calculation of this value is based is described in the embodiments described above. However, a processing unit that does not make such a comparison may be adopted.

A configuration where the processing unit 143 calculates the value of $\gamma$ based on output signals from the plurality of magnetic sensors 13a to 13j, and out of the values, the processing unit 143 compares a certain value calculated based on an output signal from a certain magnetic sensor with an average value of the plurality of remaining values is described in the embodiments described above. Without being limited thereto, however, a processing unit that does not make comparison between the certain value and the average value may be adopted.

In addition, a configuration where the processing unit 143 calculates the value of $\gamma$ based on output signals from the magnetic sensors 13a to 13j for each of the plurality of the rubber magnets 12a and 12b is described in the embodiments described above. Without being limited thereto, however, a processing unit that calculates the value of $\gamma$ based on output signals from the magnetic sensors 13a to 13j for any one of the plurality of the rubber magnets 12a and 12b may be adopted.

Alternatively, a processing unit that calculates the value of $\gamma$ based on output signals from any one of the plurality of magnetic sensors 13a to 13j for any one of the plurality of rubber magnet 12a and 12b may be adopted as the processing unit 143.

Past data may be referred to as a setting method of a threshold value, in addition to a method of learning the value of $\gamma$ (decrease amount of the thickness of the conveyor belt 11 per a predetermined moving load amount) during normal moving in advance and then setting a threshold value slightly greater than the value of $\gamma$, which is described above in the embodiments. That is, a clear abnormal value of the decrease amount $\gamma$ of the thickness of the conveyor belt 11 per a predetermined moving load amount, which is recorded in the past, may be set as a threshold value. In this manner, since an abnormal value which has actually appeared in the past is used as a threshold value, a threshold value appropriate for an environment in which the conveyor belt 11 will be actually used can be set.

In addition, it is possible to replace the configuration elements of the embodiments described above with known configuration elements appropriately without departing from the scope of the invention, and the embodiments or modification examples described above may be combined appropriately.

INDUSTRIAL APPLICABILITY

According to the invention, it is possible to provide a wear detection device for a conveyor belt that can sense an increase in a wearing speed in a case where the wearing speed of the conveyor belt has rapidly increased.

REFERENCE SIGNS LIST 1 wear detection device for a conveyor belt
11 conveyor belt
11a cover rubber
12a, 12b rubber magnet
13a to 13j magnetic sensor
14 control panel
141 calculation unit
142 storage unit
143 processing unit

The invention claimed is:

1. A wear detection device for a conveyor belt, comprising:
- a magnet member buried in a conveyor belt having an endless belt shape;
- a magnetic sensor arranged opposite to an outer circumferential surface of the conveyor belt and configured to detect a magnetic field from the magnet member to generate an output signal;
- a calculation unit configured to calculate a thickness of the conveyor belt according to the output signal generated by the magnetic sensor;
- a storage unit configured to store the thickness calculated by the calculation unit; and
- a processing unit configured to calculate a decrease amount of the thickness per a predetermined moving load amount of the conveyor belt according to the thickness stored in the storage unit and determine whether or not the value exceeds a threshold value set in advance.

2. The wear detection device for a conveyor belt according to claim 1,
wherein a plurality of the magnetic sensors are arranged at intervals in a width direction of the conveyor belt, and
the processing unit is configured to calculate the decrease amount of the thickness per the predetermined moving load amount based on the output signal from each of the plurality of the magnetic sensors, and in a case where one of the values exceeds the threshold value set in advance, the processing unit is configured to compare the value with the decrease amount of the thickness per the predetermined moving load amount, which is calculated according to the output signal from each of the other magnetic sensors adjacent to the magnetic sensor that generated the output signal on which calculation of the value is based.

3. The wear detection device for a conveyor belt according to claim 2,
wherein a plurality of the magnet members are buried in the conveyor belt at intervals in a circumferential direction, and
the processing unit is configured to calculate the decrease amount of the thickness per the predetermined moving load amount for each of the plurality of the magnet members.

4. The wear detection device for a conveyor belt according to claim 2,
wherein the threshold value is changeable.

5. The wear detection device for a conveyor belt according to claim 2,
wherein in a case where the decrease amount of the thickness per the predetermined moving load amount of the conveyor belt exceeds the threshold value, the processing unit is configured to transmit information to an external server.

6. The wear detection device for a conveyor belt according to claim 1,
wherein a plurality of the magnetic sensors are arranged at intervals in a width direction of the conveyor belt, and
the processing unit is configured to calculate the decrease amount of the thickness per the predetermined moving load amount according to the output signal from each of the plurality of the magnetic sensors, and compare, out of the values, a certain value calculated according to the output signal from a certain magnetic sensor with an average value of the plurality of remaining values.

7. The wear detection device for a conveyor belt according to claim 6,
wherein a plurality of the magnet members are buried in the conveyor belt at intervals in a circumferential direction, and
the processing unit is configured to calculate the decrease amount of the thickness per the predetermined moving load amount for each of the plurality of the magnet members.

8. The wear detection device for a conveyor belt according to claim 6,
wherein the threshold value is changeable.

9. The wear detection device for a conveyor belt according to claim 6,
wherein in a case where the decrease amount of the thickness per the predetermined moving load amount of the conveyor belt exceeds the threshold value, the processing unit is configured to transmit information to an external server.

10. The wear detection device for a conveyor belt according to claim 1,
wherein a plurality of the magnet members are buried in the conveyor belt at intervals in a circumferential direction, and
the processing unit is configured to calculate the decrease amount of the thickness per the predetermined moving load amount for each of the plurality of the magnet members.

11. The wear detection device for a conveyor belt according to claim 10,
wherein the threshold value is changeable.

12. The wear detection device for a conveyor belt according to claim 10,
wherein in a case where the decrease amount of the thickness per the predetermined moving load amount of the conveyor belt exceeds the threshold value, the processing unit is configured to transmit information to an external server.

13. The wear detection device for a conveyor belt according to claim 1,
wherein the threshold value is changeable.

14. The wear detection device for a conveyor belt according to claim 13,
wherein in a case where the decrease amount of the thickness per the predetermined moving load amount of the conveyor belt exceeds the threshold value, the processing unit is configured to transmit information to an external server.

15. The wear detection device for a conveyor belt according to claim 1,
wherein in a case where the decrease amount of the thickness per the predetermined moving load amount of the conveyor belt exceeds the threshold value, the processing unit is configured to transmit information to an external server.

\* \* \* \* \*